Aug. 2, 1955 W. A. RACHUIG 2,714,290
CONTROL DEVICE FOR INTERNAL COMBUSTION ENGINES
Filed June 16, 1951 2 Sheets-Sheet 1

INVENTOR.
Walter A. Rachuig,
BY
AGENT.

Aug. 2, 1955 W. A. RACHUIG 2,714,290
CONTROL DEVICE FOR INTERNAL COMBUSTION ENGINES
Filed June 16, 1951 2 Sheets-Sheet 2

INVENTOR.
Walter A. Rachuig,
BY
ATTORNEY

United States Patent Office 2,714,290
Patented Aug. 2, 1955

2,714,290

CONTROL DEVICE FOR INTERNAL COMBUSTION ENGINES

Walter Alfred Rachuig, Houston, Tex., assignor, by mesne assignments, to Humble Pipe Line Company, Houston, Tex., a corporation of Texas Application June 16, 1951, Serial No. 232,001

5 Claims. (Cl. 60—97)

The present invention is directed to a control device for internal combustion engines. More particularly, it is directed to apparatus for shutting down one or more internal combustion engines simultaneously in an emergency.

The present invention may be briefly described as a control device or apparatus for internal combustion engines, such as a diesel, gas or gas-diesel engine. The device comprises, in combination, an air intake line for an internal combustion engine having a first pressure responsive valve arranged therein. The internal combustion engine has a feed line connected thereto and to a source of fuel and is provided with a second pressure responsive valve located therein. The two pressure responsive valves are connected by a conduit to a source of pressure which maintains the pressure responsive valves in the intake and feed lines in an open position. The conduit is provided with quick release valves at points remote from the pressure responsive valves which is adapted to release pressure from the first and second valves and to close same, the first and second valves being arranged to close sequentially in reverse order responsive to the opening of the quick release valve.

The present invention is designed particularly as a means for shutting down internal combustion engines. In pipe line operations where diesel and gas driven engines are arranged in a pump house there are occasions when the pump house and the adjacent area may be flooded with a combustible vapor which may be ignited from the engine or engines while in operation. The operator who seeks to shut down the engine or engines exposes himself to danger of burns if not to loss of life. Consequently, the present invention provides a means for shutting down such engines without endangering personnel whenever any emergency occurs which might require the engines to be stopped.

The invention will be better understood by reference to the drawing in which

Figures 1, 2:
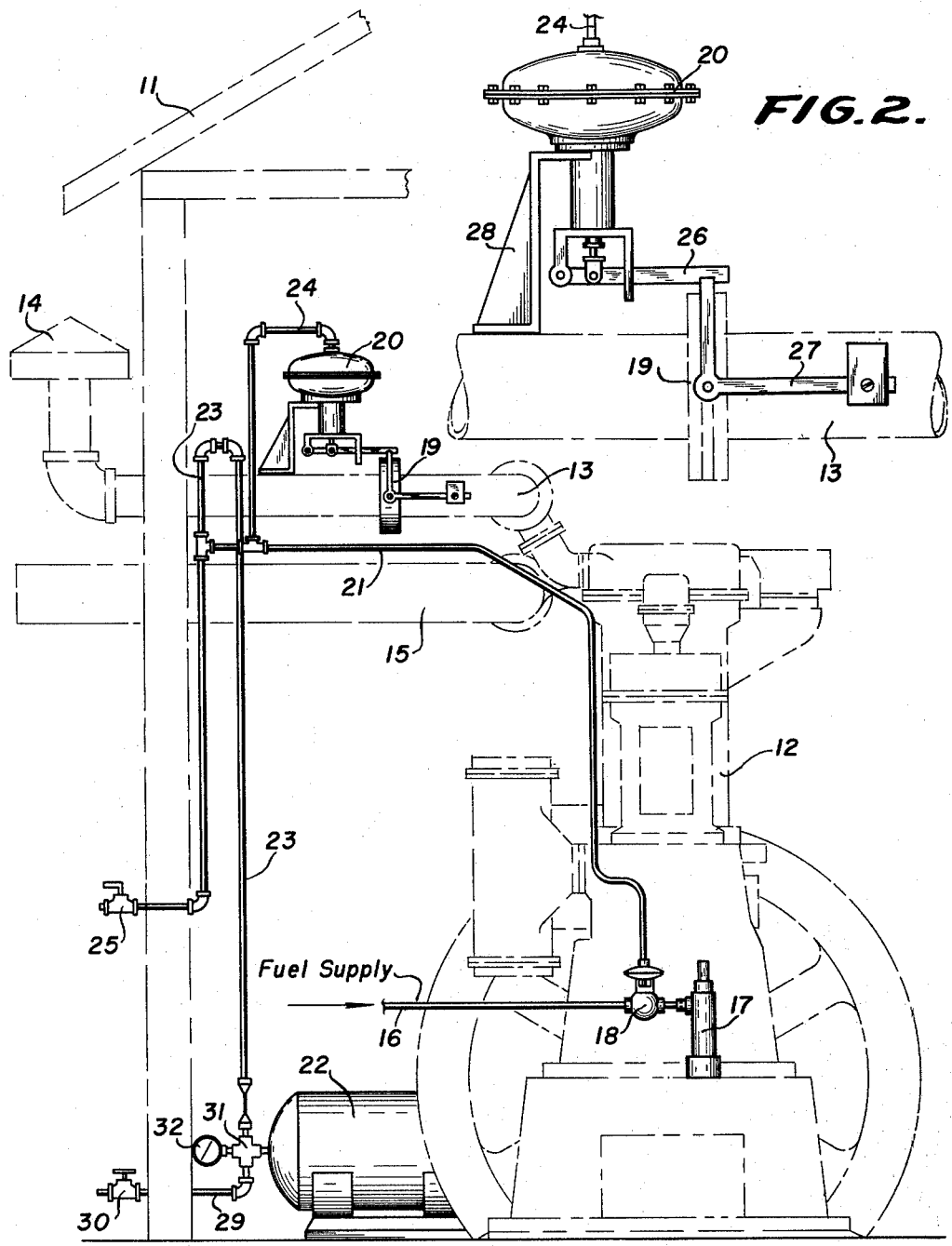
Fig. 1 is an elevational view of a preferred embodiment thereof.
Fig. 2 illustrates a type of valve to be employed in the embodiment of Fig. 1.

Referring now to the drawing, numeral 11 designates a pump house in which may be arranged an internal combustion engine or engines 12 which may be of the diesel or the gas driven type. The internal combustion engine 12 is provided with an air intake line 13 having a covered inlet 14 arranged on the exterior of building 11. An exhaust line 15 connected to engine 12 discharges combustion gases to the outside of building 11. Engine 12 is provided with a fuel line 16 communicating with a source of fuel not shown. Fuel line 16 is mounted adjacent to a fuel injector 17 which may be mounted conveniently on the engine 12. Fuel line 16 is provided with a pressure responsive valve 18 which controls the flow of fuel through line 16 to the engine 12. Mounted on air inlet line 13 is a pressure responsive valve or damper 19 which is operated by a diaphragm arrangement 20. The pressure responsive valves 18 and 19 are connected to a conduit 21 and to a source of air supply maintained in a pressure vessel 22 by conduit 23. The diaphragm arrangement 20 of valve 19 is connected to conduit 21 by a branch line 24. The conduit 23 extends to the exterior of building 11 and is provided with a quick release valve 25 which may be arranged at a convenient height for quick opening by an operator on passing by the valve.

The diaphragm arrangement 20 connected to the damper or valve 19 has a suitable linkage and lever arrangement 26 having a counter-balanced arm 27. The diaphragm arrangement 20 may be suitably mounted on intake line 13 by a bracket arrangement 28.

By way of explanation, it is to be pointed out that the chamber 22 must be pressured prior to starting-up operations by filling same with compressed air through a connecting line 29 containing a valve 30 which allows air to be introduced thereto. A four-way connection 31 is provided with an air gauge 32 to indicate the amount of air pressure in chamber 22. The other portion of the connection 31 is connected to conduit 23 as has been described.

Figure 3:
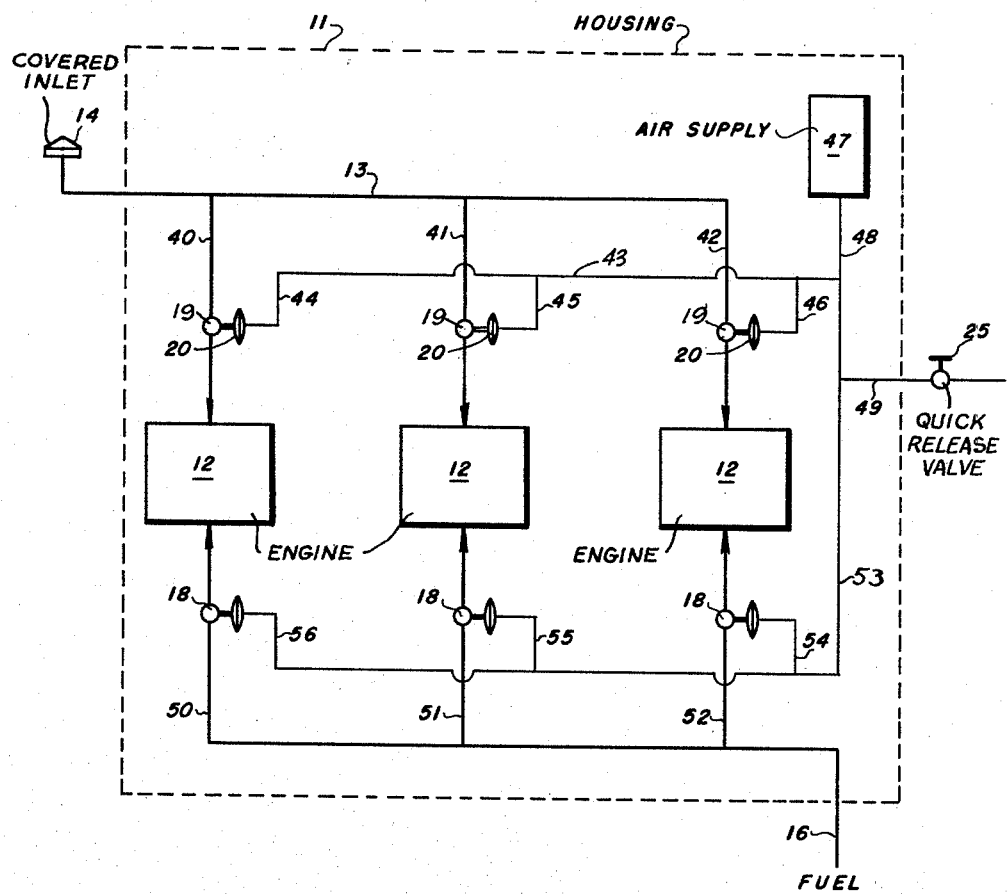
Fig. 3 is a plan view illustrating application of the invention to a plurality of engines.

Referring now to Fig. 3 in which identical numerals will be employed to designate identical parts to Figs. 1 and 2, numeral 11 designates a housing or building in which a plurality of engines, such as 12, are arranged. The engines 12 are shown as three in number but may be a lesser or greater number.

The engines 12 are connected to an air intake line 13 provided with a covered inlet 14 and the air intake line is connected to each of the engines 12 by lines 40, 41 and 42. Each of lines 40, 41 and 42 is provided with a pressure responsive valve 19, such as shown in Figs. 1 and 2, operated by a diaphragm arrangement 20. It is understood that the diaphragm arrangement 20 and valve 19 include the attending linkages 26 and 27, as shown in Figs. 1 and 2.

The diaphragm arrangements 20 of valves 19 of Fig. 3 are connected by line 43 and by branches 44, 45 and 46 to a common source of air supply 47 through a branch line 48. Branch line 48 is provided with a bleed line 49 controlled by a quick release valve 25 on the exterior of the building 11 at a point remote from the valves or dampers 19.

Connected to the engines 12 is a fuel line 16, which is adapted to be connected to a source of fuel, and which in turn is connected to engines 12 by lines 50, 51 and 52. Arranged in lines 50, 51 and 52 are diaphragm valve assemblies 18 similar to the valve assemblies 18 of Fig. 1. The diaphragm valve assemblies 18 are connected to line 48 and to air supply 47 by line 53 and branch lines 54, 55 and 56 connecting thereto.

The present invention is operated in the following manner:

If for any reason it becomes desirable to shut down the internal combustion engine or engines 12 such as due to a hazardous accumulation of vapors, the operator may quickly release the system by running past valve 25 and opening same. On releasing presssure the valve 18 which was set to close at a pressure of about 15 pounds closes off the fuel supply to engine 12 by closing off line 16. This prevents the accumulation of fuel in the engine as it is turning over and prevents injury to the engine, such as to the connecting rods by having an over supply of fuel present during a subsequent start-up period. If an accumulation of hydrocarbon vapors are present, these vapors would be pulled into the engine through intake line 13. Therefore, the apparatus is set so that valve 19 is operated sequentially to valve 18. In short, valve 18 will close when the pressure is released down to about 15 pounds and the valve or damper 19 will close when the pressure is further released down to about 10 pounds. In other words, there is a short interval of time between the closing of valve 18 and the shut-off of the fuel supply and the closing of valve 19 and the shut-off of the air supply thus permitting complete consumption of the fuel in the engine.

While the valves 18 and 19 have been illustrated and exemplified as diaphragm operated valves, other pressure responsive or fluidly operated valves may be used in lieu thereof.

It is also understood that while gas engines and diesel engines have been exemplified in the apparatus of the present invention, that other internal combustion engines may be substituted therefor.

The nature and objects of the present invention have been completely described and illustrated, what I desire to claim as new and useful and to secure by Letters Patent is:

1. A control apparatus for an internal combustion engine which comprises, in combination, an atmospheric air intake line for an internal combustion engine, a feed line adapted to be connected to a source of fuel and connected to said engine, a first cut-off valve in said air intake line, a second cut-off valve in said feed line, pressure supply means for maintaining said first and second valves in an open position, and a quick opening release valve operatively connected to said first and second valves at a point remote therefrom adapted to release pressure from said first and second valves and to close same, said first and second valves being arranged to close substantially simultaneously responsive to opening of said quick release valve.

2. A control apparatus for an internal combustion engine which comprises, in combination, an atmospheric air intake line for an internal combustion engine, a feed line adapted to be connected to a source of fuel and connected to said engine, a first fluidly operated cut-off valve in said air intake line, a second fluidly operated cut-off valve in said feed line, a conduit connected to a source of fluid pressure and to said first and second valves adapted to maintain same in an open position, and a quick opening release valve in said conduit at a point remote from said first and second valves adapted to release pressure from said first and second valves and to close same, said first and second valves being arranged to close substantially simultaneously responsive to opening of said quick release valve.

3. Apparatus in accordance with claim 2 in which the first and second valves are diaphragm operated valves.

4. A control device for an internal combustion engine arranged in a housing which comprises an atmospheric air intake line for said internal combustion engine, a first pressure responsive valve arranged in said air intake line, a feed line for said internal combustion engine adapted to be connected to a source of fuel, a second pressure responsive valve arranged in said feed line at a point adjacent the engine, a conduit connected to a source of pressure and to said first and second valves adapted to maintain same in an open position, and a quick opening release valve in said conduit at a point remote from said first and second valves and exterior to the housing adapted to release pressure from said conduit and to close substantially simultaneously said first and second valves responsive to opening said quick release valve.

5. A control apparatus for a plurality of internal combustion engines arranged in a common building which comprises, in combination, an atmospheric air intake line connected to each of said internal combustion engines, a feed line adapted to be connected to a source of fuel and connected to each of said engines, separate first cut off valves in said air intake line for each of said engines, separate second cut off valves in said fuel line for each of said engines, pressure supply means for maintaining each of said first and second valves in an open position, and a quick opening release valve operatively connected to each of said first and second valves at a point exterior to the building adapted to release pressure from each of said first and second valves and to close same and shut down said engines simultaneously, said first and second valves being arranged to close substantially simultaneously responsive to opening of said quick release valve.

References Cited in the file of this patent

UNITED STATES PATENTS

| 1,386,608 | Du Pont | Aug. 9, 1921 |
| 1,846,654 | Prechtel | Feb. 23, 1932 |
| 1,896,459 | Mullin | Feb. 7, 1933 |
| 2,175,866 | Arnold | Oct. 10, 1939 |
| 2,397,986 | Senninger | Apr. 9, 1946 |
| 2,435,343 | Downey | Feb. 3, 1948 |
| 2,467,685 | Newcomb | Apr. 19, 1949 |
| 2,612,145 | Steven et al. | Sept. 30, 1952 |

FOREIGN PATENTS

| 536,805 | Great Britain | May 28, 1941 |